(12) United States Patent
Ben Ari et al.

(10) Patent No.: US 11,436,260 B2
(45) Date of Patent: Sep. 6, 2022

(54) REVERSE CLASSIFICATION

(71) Applicant: ServiceNow, Inc., Santa Clara, CA (US)

(72) Inventors: Tal Ben Ari, Ness Ziyonna (IL); Alon Mansour, Ramat Gan (IL); Rotem Steuer, Modin (IL); Tal Epshtein, Hod Hasharon (IL)

(73) Assignee: ServiceNow, Inc., Santa Clara, CA (US)

( * ) Notice: Subject to any disclaimer, the term of this patent is extended or adjusted under 35 U.S.C. 154(b) by 5 days.

(21) Appl. No.: 15/930,345

(22) Filed: May 12, 2020

(65) Prior Publication Data

US 2021/0357427 A1    Nov. 18, 2021

(51) Int. Cl.
   *G06F 16/00*           (2019.01)
   *G06F 16/28*           (2019.01)

(52) U.S. Cl.
   CPC ................... *G06F 16/285* (2019.01)

(58) Field of Classification Search
   CPC ....................................................... G06F 16/285
   USPC ......................................................... 707/738
   See application file for complete search history.

(56) References Cited

U.S. PATENT DOCUMENTS

| | | | |
|---|---|---|---|
| 10,042,618 B1* | 8/2018 | Hulbert | .................... G06F 9/54 |
| | | | 707/707 |
| 2014/0095343 A1* | 4/2014 | Daniel | .................... G06F 16/00 |
| | | | 705/26.5 |
| 2019/0104020 A1* | 4/2019 | Tero | ................... G06Q 30/0641 |
| | | | 707/707 |
| 2020/0241896 A1* | 7/2020 | Hulbert | ................ G06F 9/5072 |
| | | | 707/707 |

* cited by examiner

*Primary Examiner* — Alexandria Y Bromell
(74) *Attorney, Agent, or Firm* — Van Pelt, Yi & James LLP (57) ABSTRACT

Attributes of a configuration item record of a configuration management database (CMDB) are received. Based on the received attributes, a determination is made that the configuration item record belongs to a new child class and no longer belongs to a previously identified child class. While maintaining a same identifier in the configuration item record, a classification of the configuration item record is changed to the new child class including by adding one or more attributes of the new child class to the configuration item record and removing one or more attributes of the previously identified child class from the configuration item record.

20 Claims, 7 Drawing Sheets

REVERSE CLASSIFICATION

BACKGROUND OF THE INVENTION

A configuration management database (CMDB) is commonly used to manage items for an organization. The managed items are represented as configuration items in the CMDB and can include servers, virtual machines, docker containers, online services, etc. Using a CMDB has many advantages, including the ability to track each managed item's history, which can include events such as report tickets, change requests, incident reports, health reports, etc.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Configuration item classification using reverse classification in disclosed. Traditional management techniques allow a managed item to be reclassified as a more refined class type by descending down an inheritance hierarchy. As more details of the item are learned, the class can be refined, for example, from a computer to a Windows server. However, in some scenarios, a managed item can also be converted to a new class type that is not a descendant of the old class type. For example, a hardware Linux server can be converted to a hardware router. Because a hardware router class is not a descendent of a Linux server class, when the managed item is assigned the class type of a hardware router, the change in class type results in losing the historical knowledge associated with the hardware server. Whenever the class of a managed item is modified in this manner, it is a technical challenge to seamlessly retain the existing information for the managed item in the CMDB. In order to automatically classify configuration items without limiting classification to descendants of a class inheritance hierarchy or losing existing information associated with the configuration item record, a reverse classification is performed as part of reclassifying the configuration item.

In some embodiments, a managed item in a configuration management database (CMDB) can be reclassified to a new class that is not a descendent of its previous class. The technique involves identifying the best class definition for the managed item by implementing a technique for reverse classification. When updated attributes for a managed item are received, a configuration item record corresponding to a managed item in the CMDB is updated to reflect a change in class. Instead of limiting reclassification to refining the class type along a class hierarchy, a reverse classification is performed. With reverse classification, traversal up the class hierarchy is performed to identify the correct ancestor class of the managed item's new class. The identified ancestor is a common ancestor of the previous and new class types. Once the common ancestor is found, traversal is performed down the class hierarchy to identify the class with the best definition. The best class is either the common ancestor or a descendent of the common ancestor. Once found, the best class is identified as the new class for the managed item and the class type is updated in the configuration item record. Along with a new class type, the attributes for the managed item are also updated in the configuration item record. In various embodiments, the update preserves the identifier for the configuration item record. This allows information previously associated with the managed item when configured as the old class to be seamlessly preserved despite the change in class type. For example, report tickets, change requests, incident reports, classification change events, and/or health reports, etc. of the managed item are retained despite the change in class type. Health reports can include uptime/downtime records, network disconnection records, CPU utilization records, network utilization records, disk utilization records, etc. and provide a more detailed view of the managed item's operations over time. In various embodiments, this process is performed both seamlessly and automatically without administrator intervention. By preserving the historical knowledge of the item across class changes, an administrator is able to have a much greater and more accurate understanding of the assets under their control. Responses to future incident reports can be informed by the managed item's history resulting in more accurate and effective management of the configuration item.

In some embodiments, a method comprises receiving attributes of a configuration item record of a configuration management database (CMDB). For example, a CMDB is used to manage an item, such as a server or online service. In some embodiments, a server, which was previously configured as a Windows server, is newly reconfigured as a Linux server. The managed server has a corresponding configuration item record in the CMDB reflecting its old configuration. The existing information in the CMDB for the configuration item record includes information gathered while the server was configured as a Windows server. Attributes for the configuration item record of the server are received, such as IP address, disk size, distribution, and kernel version attributes. Based on the received attributes, the configuration item record is determined to belong to a new child class and no longer belong to a previously identified child class. For example, based on the new attributes received, such as the distribution and kernel version attributes, the managed server and corresponding configuration item record is determined to now belong to the Linux server class and no longer belong to the Windows server class. The received attributes correspond to a Linux server and no longer correspond to a Windows server.

In some embodiments, a classification of the configuration item record is changed to the new class including by adding one or more attributes of the new class to the configuration item record and removing one or more attributes of the previously identified class from the configuration item record while maintaining a same identifier in the configuration item record. For example, a distribution attribute and a kernel version attribute are now added to the configuration item record of the managed server and a Windows version attribute is removed. The new attributes correctly correspond to the new configuration status of the server. Moreover, the configuration item record maintains the same identifier. In some embodiments, the change in classification requires traversing up the class hierarchy to identify a common ancestor before traversing down the class hierarchy to identify the best child class. Once the child class with the best fitting definition is found, the attributes for the configuration item record are updated to reflect the newly found class. Attributes no longer valid are removed and new attributes, which can correspond to new features and/or capabilities, are added. Importantly, the history associated with an old configuration and the previously identified class is preserved and seamlessly retained despite changing the item's class to a new class.

Figure 1:
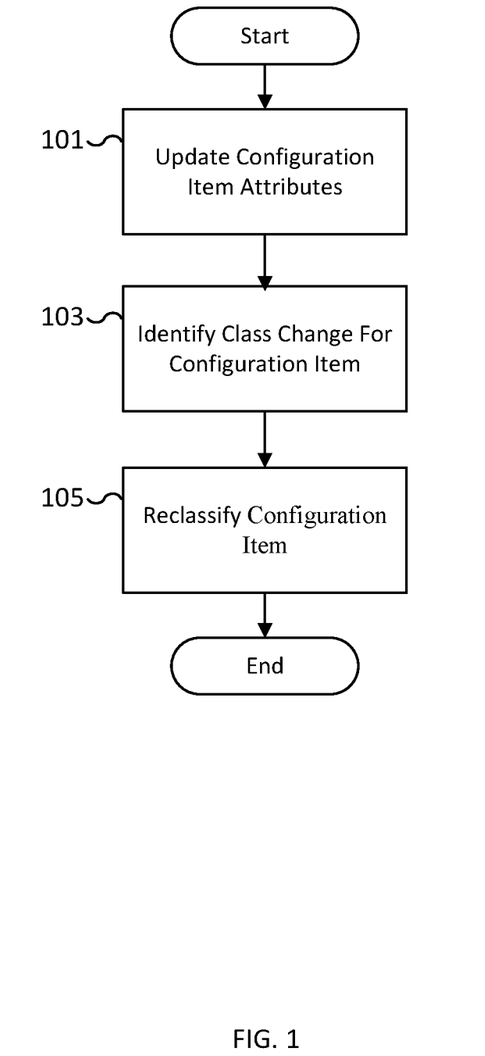
FIG. 1 is a flow chart illustrating an embodiment of a process for managing configuration item class changes.

FIG. 1 is a flow chart illustrating an embodiment of a process for managing configuration item class changes. In the example shown, a managed item is a configuration item represented as a configuration item record in a configuration management database (CMDB). The process of FIG. 1 manages class type changes by monitoring for any changes in an item's attributes and updating the class type associated with a configuration item when a class change is identified. In various embodiments, the class type is updated by a reclassification process.

At 101, configuration item attributes are updated. For example, a configuration item receives updated attributes. The received attributes may represent a change when compared to previous attributes recorded for the configuration item. Each attribute may represent a feature, capability, or another characteristic of the item. Examples of received attributes may include an IP address, disk size, Windows version, Linux distribution, and Linux kernel version, among other attributes. In some embodiments, one or more agents or processes monitor managed items and provide updated attributes as they are discovered. For example, once ports are opened for a server, a discovery process identifies a server as having a Linux distribution and version attributes. As another example, attributes will change when a managed item is reconfigured, for example, by converting a Linux server to a router.

At 103, a class change for a configuration item is identified. In some embodiments, the attributes received for a configuration item are compared to the current class attributes associated with the item in the CMDB. As represented by a configuration item record, each managed or configuration item has a class type that is used, at least in part, to track attributes and changes in attributes for the item. In the event the attributes received at 101 and the attributes associated with the configuration item record no longer match, a class change is identified. For example, after a reconfiguration event, the attributes received for a configuration item no longer match the current class type as stored in the configuration item record of the item.

At 105, the configuration item is reclassified. Once a class change is identified at 103, a new class is identified and the configuration item is reclassified by updating the class type associated with the configuration item record in the CMDB. In various embodiments, the new class type is identified by matching the attributes received at 101 with class attribute definitions to find the best fit class for the configuration item. The class can be changed to a descendant of the current class or a class that is not a descendant. In various embodiments, a class change that is a descendant of the current class is a class refinement and involves traversing down the class inheritance hierarchy by performing a forward classification. A new class that is the result of a class change that is not a descendant of the current class cannot be identified by performing a traditional forward classification. In some embodiments, a reverse classification process is utilized that traverses up the class inheritance hierarchy to first identify a common ancestor. Once a common ancestor is identified, the best fit class can be identified by performing a forward classification.

In some embodiments, the reclassification includes updating the attributes of the configuration item record to accurately reflect the current attributes of the configuration item. For example, new attributes of the newly identified class are added and attributes of the previously identified class that are no longer valid are removed.

Figure 2:
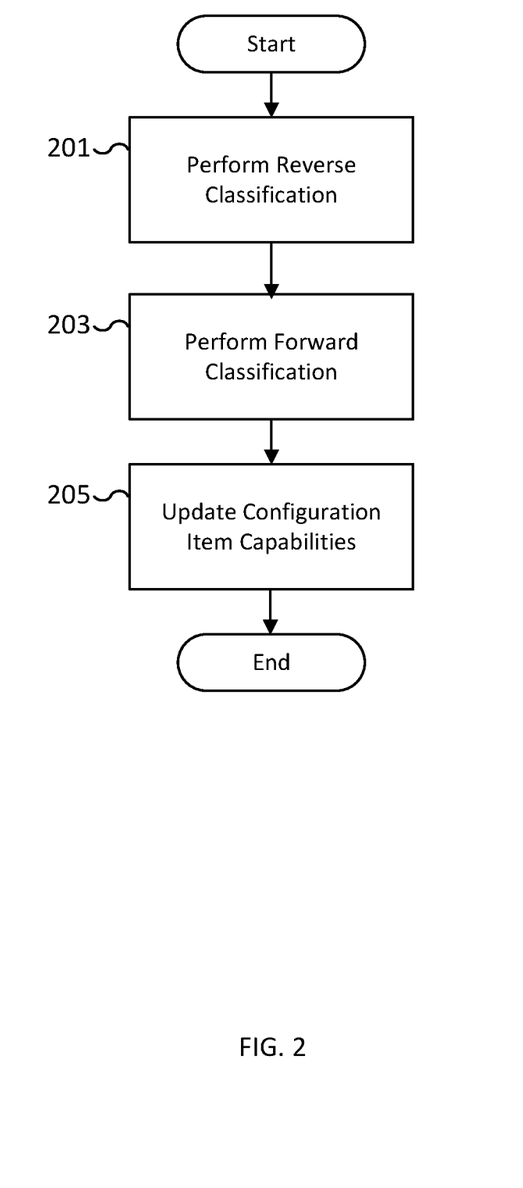
FIG. 2 is a flow chart illustrating an embodiment of a process for reclassifying a configuration item.

FIG. 2 is a flow chart illustrating an embodiment of a process for reclassifying a configuration item. In the example shown, a new class type for the configuration item is identified and the corresponding configuration item record in a configuration management database (CMDB) is updated. In various embodiments, the process of FIG. 2 is utilized to find the best fit class type when a change in class type is identified. In some embodiments, the process of FIG. 2 is only utilized when the new class type is not a descendent of the item's previous class type. For example, the process of FIG. 2 is utilized when the class type of an item is no longer compatible with the item's attributes. In some embodiments, the process of FIG. 2 is performed at 105 of FIG. 1.

At 201, reverse classification is performed. In various embodiments, one or more ancestor classes are examined by traversing up the class inheritance hierarchy starting at the current associated class type as stored in the CMDB. For each examined class, a determination is made whether the class is a common ancestor of the item's old and new class. In various embodiments, a common ancestor has attributes that are compatible with both classes. The reverse classification process is complete once the first common ancestor is identified.

At 203, forward classification is performed. Starting with the first common ancestor, classes are examined to identify the class with an attribute definition that best fits the configuration item. For example, the updated attributes of the item are compared with the attributes of the current class being examined. In the event the attributes are compatible, child classes are examined by traversing down the class inheritance hierarchy to refine the class type search. By traversing down the class inheritance hierarchy, the best fit class can be found among the common ancestor and its descendants. The forward classification process is complete once the best fit class among the common ancestor and its descendants is identified.

At 205, configuration item capabilities are updated. For example, the capabilities of the configuration item are updated in the CMDB by updating the attributes associated with the configuration item record. In various embodiments, the attributes of the configuration item record will match the attributes (and compatibles) of the newly identified class. In some embodiments, one or more attributes of the new class are added to the configuration item record and one or more attributes of the previously identified class are removed from the configuration item record. Throughout the process of FIG. 2, the configuration item record maintains the same identifier. By preserving the same identifier across item reconfigurations, information such as history records associated with the configuration item are preserved and seamlessly retained despite changing the item's class to a new class.

In some embodiments, the capabilities of a configuration item are updated while traversing the class inheritance hierarchy. For example, as compatible classes are identified by traversing up (as in step 201) and/or down (as in step 203) the class inheritance hierarchy, attributes associated with the configuration item record in the CMDB are updated to add compatible attributes and to remove incompatible attributes.

Figure 3:
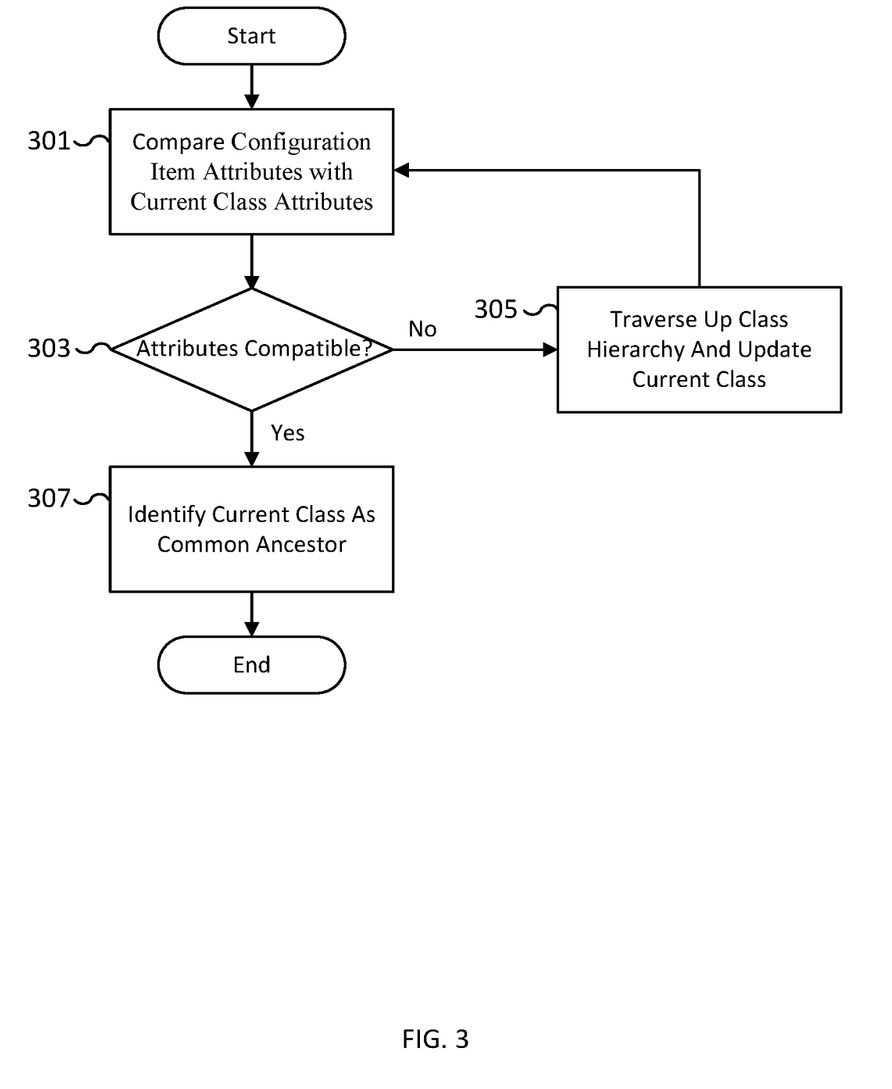
FIG. 3 is a flow chart illustrating an embodiment of a process for performing reverse classification on a configuration item.

FIG. 3 is a flow chart illustrating an embodiment of a process for performing reverse classification on a configuration item. In some embodiments, the process of FIG. 3 is performed when the class type for a configuration item has changed. In order to identify the new class type and to update the configuration item record of the managed item in a configuration management database (CMDB), a reverse classification is first performed to identify an ancestor of the new class type. In various embodiments, the process of FIG. 3 is only utilized when the new class type is not a descendent of the item's previous class type. For example, the process of FIG. 3 is utilized when the class type of an item is no longer compatible with the item's attributes. In various embodiments, the process of FIG. 3 is an iterative process that traverses up the class inheritance hierarchy starting with the configuration item's current class as represented in the CMDB. As the class inheritance hierarchy is traversed, the current class is updated until an ancestor of the new class is identified. In some embodiments, the process of FIG. 3 is performed at 201 of FIG. 2.

At 301, attributes of the configuration item are compared with the attributes of the current class. In various embodiments, starting with the configuration item's current class as represented in the CMDB, the current class attributes are compared with the configuration item's actual attributes. The current class can also be an updated class type resulting from traversing up the class inheritance hierarchy at 305. In various embodiments, the current class attributes are no longer compatible with the actual item's attributes as a result of a class change. The incompatibility indicates that information associated with the configuration item record in the CMDB is out of date and that an ancestor to the new class has not yet been identified. Both the attributes and the class type will need to be updated for the configuration item record.

At 303, a determination is made whether the attributes compared at 301 are compatible. In various embodiments, the configuration item and current class attributes are compatible when the attributes of the current class are a subset (or an exact match) of the configuration item's class attributes. A compatible class indicates the current class is an ancestor (or an exact match) of the new class. For example, a server with attributes IP address and disk size is an ancestor of a Windows server with attributes IP address, disk size, and Windows version. In the event the attributes are not compatible, processing proceeds to step 305. In the event the attributes are compatible, processing proceeds to step 307.

At 305, the current class is updated by traversing up the class inheritance hierarchy. The parent of the current class is identified and set at the new current class. For example, in some scenarios, the parent of a Windows server is a server. In the event the current class is a Windows server, at 305, the current class is updated to be a server by traversing from the child Windows server class to the parent server class.

In some embodiments, attributes of the old class that are common to the new class are preserved and those that are no longer valid are removed. For example, the parent server class has attributes IP address and disk size while the child Windows server class has attributes IP address, disk size, and Windows version. When traversing from the Windows server class to the server class, the attributes IP address and disk size are retained and the Windows version attribute is removed. Once the current class is updated in the configuration item record, processing loops back to 301.

At 307, the current class of the class inheritance hierarchy is identified as the common ancestor. The identified common ancestor is a common ancestor of the previously identified class for the configuration item as stored in the CMDB and of the new class of the configuration item. In some embodiments, the identified common ancestor is not the best class definition for the configuration item and the class type needs additional refinement. The identified common ancestor class can be later utilized as a starting point for performing a forward classification such as the forward classification of FIG. 4. In some embodiments, the configuration item record is updated to reflect the common ancestor class as the current class of the configuration item. In some embodiments, attributes of the old class that are common to the new class are preserved and those that are no longer valid are removed.

Figure 4:
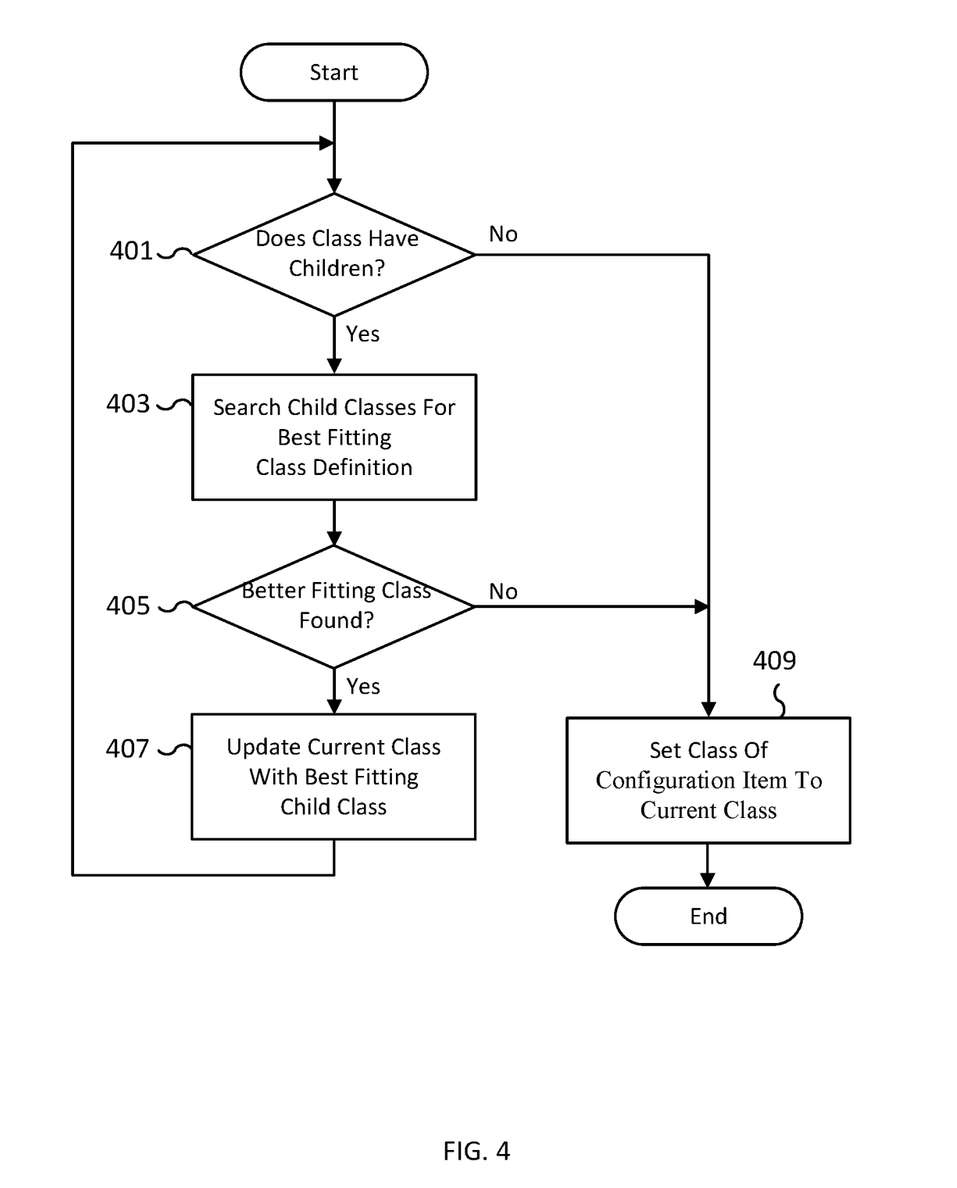
FIG. 4 is a flow chart illustrating an embodiment of a process for performing forward classification on a configuration item.

FIG. 4 is a flow chart illustrating an embodiment of a process for performing forward classification on a configuration item. In some embodiments, the process of FIG. 4 is performed when the class type for a configuration item has changed and a common ancestor of the previously identified class for a configuration item and the new class of the configuration item has been identified. In order to identify the new class type and to update the configuration item record of the managed item in a configuration management database (CMDB), a forward classification is performed starting at the identified common ancestor. In various embodiments, the process of FIG. 4 is an iterative process that traverses down the class inheritance hierarchy. As the class inheritance hierarchy is traversed, the current class is updated until the new class type is identified. In some embodiments, the process of FIG. 4 is performed at 203 of FIG. 2.

At 401, a determination is made whether the current class has children. For example, the class inheritance hierarchy is examined to determine whether the current class has one or more children. In the event the current class has one or more children, processing continues to 403. In the event the current class does not have a child, processing continues to 409.

At 403, child classes are searched for the class with the best fitting class definition. For example, the class inheritance hierarchy is examined to determine whether any children of the current class have a class definition that better fits the configuration item. In some embodiments, the best fitting definition is determined by comparing the attributes of the class type with the attributes of the configuration item. A class is a better fitting class definition than another class if it has more attributes of the class type that match the attributes of the configuration item without requiring any attributes that the configuration item does not have. In some scenarios, the best fitting child class will be the actual class type of the configuration item. In some scenarios, additional searching will be required to refine the class type by examining the children of the best fitting child class. In some scenarios, no child class is found to be a better fitting class for the configuration item than the current class.

At 405, a determination is made whether a better fitting class is found. In the event a child class is found to be a better fitting class for the configuration item, processing continues to 407. In the event a child class is not found to be a better fitting class for the configuration item, processing continues to 409.

At 407, the current class is updated with the best fitting child class. For example, the class type associated with the configuration item record for the configuration item is updated to the best fitting child class. This update reflects a refinement in the class type of the configuration item in the CMDB while preserving information gathered when the configuration item was configured as the parent class type. In some embodiments, a further refinement in class type is necessary, for example, in the event a child of the best fitting child class is a better fitting class. In some embodiments, the configuration item record is also updated to reflect the attributes of the configuration item. For example, one or more attributes of the child class are added to the configuration item record. Once the update is completed, processing loops back to 401.

At 409, the class of the configuration item is set to the current class. For example, the class type associated with the configuration item record for the configuration item is updated to the current class. This update reflects the correct class type of the configuration item in the CMDB while preserving information gathered when the configuration item was configured as the previous class type. In some embodiments, the configuration item record is also updated to reflect the attributes of the configuration item. For example, one or more attributes of the new class are added to the configuration item record.

Figure 5:
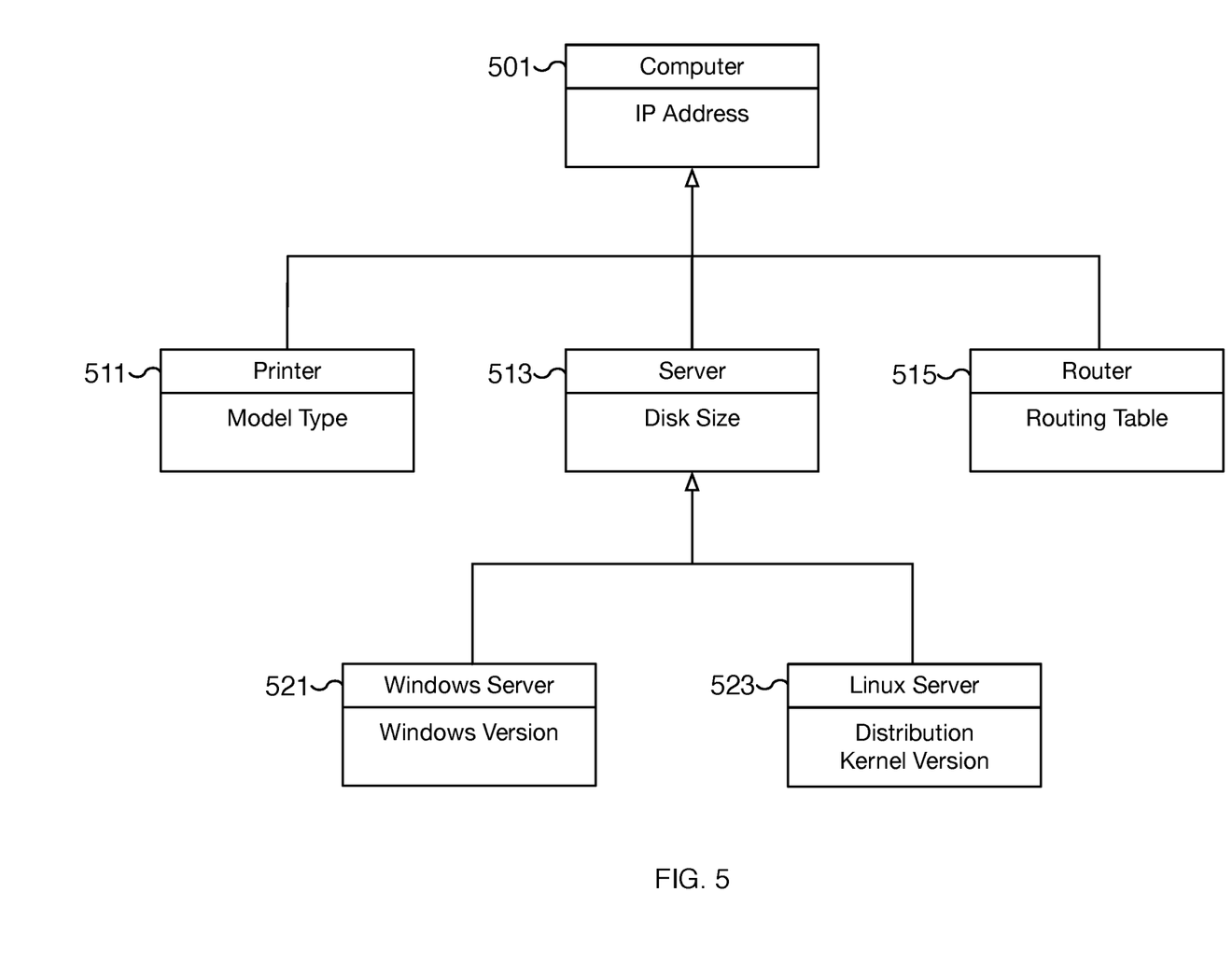
FIG. 5 is a diagram illustrating an example class inheritance hierarchy for configuration items managed using a configuration management database (CMDB).

FIG. 5 is a diagram illustrating an example class inheritance hierarchy for configuration items managed using a configuration management database (CMDB). In various embodiments, a class inheritance hierarchy such as the one of FIG. 5 is utilized to perform reclassification including reverse classification by traversing up the class inheritance hierarchy. In some embodiments, the processes of FIGS. 1-4 utilize a class inheritance hierarchy such as the one of FIG. 5. In the example shown, the class inheritance hierarchy includes classes computer 501, printer 511, server 513, router 515, Windows server 521, and Linux server 523 and depicts the relationship between the different classes. For example, class Windows server 521 and class Linux server 523 are children of class server 513. Classes printer 511, server 513, and router 515 are children of base class computer 501. Each depicted class includes all the attributes of its particular class as well as its ancestors. For example, the class computer 501 includes an IP address attribute. The class printer 511 is a child of class computer 501 and includes the attributes IP address (inherited from its parent) and the model type attribute. The classes server 513 and router 515 also include the IP address attribute but class server 513 additionally includes attribute disk size and class router 515 additionally includes attribute routing table. Both classes Windows server 521 and Linux server 523 are children of class server 513 and grandchildren of class computer 501. The class Windows server 521 includes the attributes IP address (inherited from class computer 501), disk size (inherited from class server 513), and Windows version. Similarly, the class Linux server 523 includes the attributes IP address (inherited from class computer 501), disk size (inherited from class server 513), distribution, and kernel version.

In the class inheritance hierarchy diagram of FIG. 5, each class is a child class that points to its parent class with the exception of the computer class, which is the base or root class, has no parent, and is a common ancestor of each of the child classes. In various embodiments, the attributes of a class may include features and/or capabilities and function as a class definition. A configuration item's class type can be identified by comparing the item's actual attributes to the attributes of a class. When an exact match is found, the exact class type is identified. In the event the attributes of the configuration item are a superset of a class's attributes, the class is compatible with the configuration item and is an ancestor class of the configuration item's class.

Figure 6:
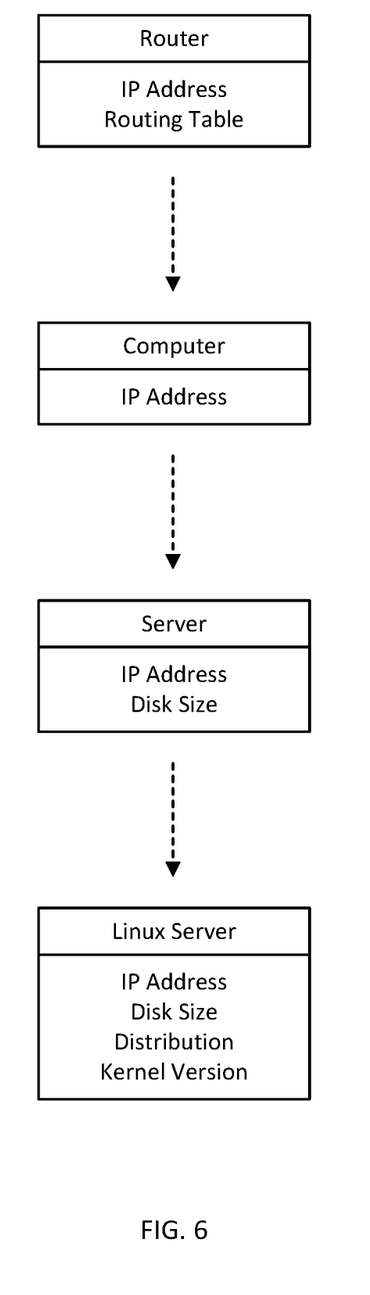
FIG. 6 is a diagram illustrating an example of the reclassification of a configuration item for a configuration management database (CMDB).

FIG. 6 is a diagram illustrating an example of the reclassification of a configuration item for a configuration management database (CMDB). In various embodiments, the reclassification is performed using the processes of FIGS. 1-4 and the class inheritance hierarchy of FIG. 5. In the example shown, the reclassification corresponds to a hardware router that is reconfigured as a Linux server. In some embodiments, the reclassification corresponds to identifying that the class type of a managed device changes from a router, such as class router 515 of FIG. 5, to a Linux server, such as class Linux server 523 of FIG. 5. Once the managed device is reconfigured, the class type of the configuration item is updated and information associated with the configuration item in the CMDB is retained despite the change in class type. In some embodiments, one or more agents and/or discovery processes identify the new attributes of the managed item. In the example shown, the configuration item starts out as a router and includes the attributes IP address and routing table. In various embodiments, a discovery process provides updated attributes and a determination is made that the attributes for the configuration item have changed. The new configuration item no longer includes the routing table attribute. At this (or a later) time, additional attributes such as disk size, distribution, and kernel version are identified for the configuration item. A reverse configuration is performed on the configuration item using the corresponding configuration item record and class inheritance hierarchy to identify the parent of the router class. The identified parent is a computer class with the sole attribute IP address. Since the computer class attribute definition is compatible with the configuration item, the computer class is identified as the common ancestor of the old class (i.e., the computer class) and the new class (i.e., the not yet identified Linux server class). In various embodiments, the class type associated with the configuration item record is updated to the common ancestor class while retaining the same record identifier. Attributes that are no longer valid, such as the routing table attribute, may be removed from the configuration item record. In some embodiments, the attributes that are no longer valid are removed once a final class type is identified or once an initial forward classification is performed.

In various embodiments, once a common ancestor is identified, a forward classification is performed. For example, the best fitting class definition is identified from the children of the common ancestor class. In this scenario, the common ancestor class is the computer class. The best child of the computer class is the server class, which includes an additional attribute disk size. In some embodiments, the class type associated with the configuration item record is updated to the server class and new attributes of the server class, such as the disk size attribute, are added to the configuration item record. The forward classification process continues for the configuration item and the Linux server class is identified as the best child of the server class. The class type associated with the configuration item record is updated to the Linux server class and new attributes of the Linux server class, such as the distribution and kernel version attributes, are added to the configuration item record. The reclassification is now complete as there are no better child classes for the configuration item. In various embodiments, the class of the configuration item can be further refined as new attributes are discovered. Throughout the reclassification process, the configuration item record maintains the same identifier, such as a CMDB record identifier. This allows the configuration item record to retain information from when the item was previously identified as a different class and provides to the administrator a significantly more accurate view of the managed item that can include historical records such as report tickets, change requests, incident reports, classification change events, and health reports.

Figure 7:
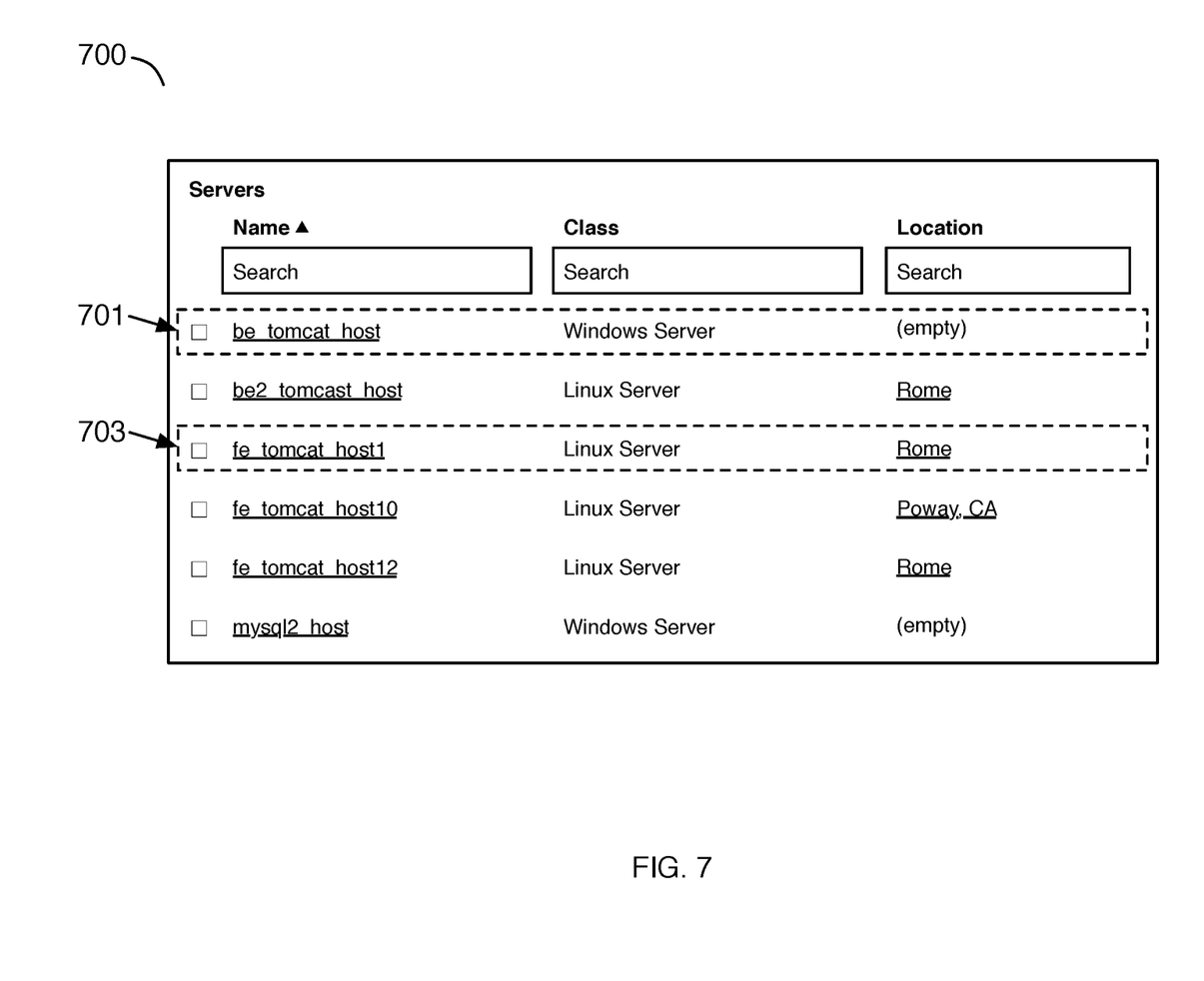
FIG. 7 is a diagram illustrating an embodiment of a user interface for a configuration management database (CMDB).

FIG. 7 is a diagram illustrating an embodiment of a user interface for a configuration management database (CMDB). User interface 700 displays managed items as configuration items. Each configuration item has a corresponding configuration item record in the CMDB. In the example shown, user interface 700 displays a configuration item's name, class type, and location. Other associated information can be stored in the CMDB but is not displayed in the example shown. For example, a configuration item record can include a unique identifier, such as a CMDB record identifier, a description of the configuration item, and an identifier of the owner of the configuration item, among other information. Using the techniques discussed herein, when the class type for a configuration item changes, the new class type is identified and reflected in the CMDB without any administrator intervention. A current and accurate view of the CMDB and corresponding configuration items and class types are displayed to the administrator via user interface 700. Notably, when a class type changes, the configuration item record preserves the information associated with the item despite the change in class. In some embodiments, the configuration item record maintains the same identifier (such as a record identifier) across class changes. Information associated with the configuration item and stored in the CMDB is seamlessly retained without loss of historic data. In various embodiments, the change in class type is accompanied by adding one or more attributes of the new class to the configuration item record and removing one or more attributes of the previously identified class from the configuration item record.

In the example shown, user interface 700 displays multiple entries corresponding to different configuration items managed via a CMDB. For example, entry 701 represents a configuration item record for a configuration item named "be_tomcat_host" that has the current class "Windows Server." The location of the "be_tomcat_host" configuration item has been left empty. As another example, entry 703 represents a configuration item record for a configuration item named "fe_tomcat_host1" that has the current class "Linux Server." The location of the "fe_tomcat_host1" configuration item is "Rome." In the event the configuration items are (or have been) reconfigured, the knowledge associated with each item is retained after the reclassification process to identify an item's new class type. In various embodiments, the reclassification process utilizes the processes of FIGS. 1-4.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving attributes of a configuration item record of a configuration management database (CMDB) identified as belonging to a previously identified child class;
determining based on the received attributes that the configuration item record should belong to a new child class and no longer belongs to the previously identified child class; and
changing a classification of the configuration item record from the previously identified child class to the new child class including by, in response to determining to change the classification, automatically adding to the configuration item record one or more attributes of the new child class not previously belonging to the configuration item record and automatically removing from the configuration item record one or more attributes of the previously identified child class determined to be no longer valid to due to changing of the classification, while maintaining a same identifier in the configuration item record.

2. The method of claim 1, wherein the configuration item record is associated with a managed item.

3. The method of claim 2, wherein the managed item is a server, a virtual machine, a docker container, a software application, an online service, a printer, a router, or a computer.

4. The method of claim 1, wherein the new child class and the previously identified child class share a common ancestor class.

5. The method of claim 4, wherein the configuration item record is associated with a managed item, and wherein determining based on the received attributes that the configuration item record belongs to the new child class and no longer belongs to the previously identified child class includes:
determining that the managed item no longer belongs to the previously identified child class;

determining that the managed item belongs to the common ancestor class;
changing the classification of the configuration item record to the common ancestor class;
determining that the managed item belongs to the new child class; and
changing the classification of the configuration item record to the new child class.

6. The method of claim 5, wherein determining that the managed item no longer belongs to the previously identified child class includes determining that the received attributes no longer match attributes of the previously identified child class.

7. The method of claim 5, wherein determining that the managed item belongs to the common ancestor class includes:
traversing a class inheritance hierarchy of the previously identified child class to identify one or more ancestor classes of the previously identified child class;
selecting one of the one or more ancestor classes, wherein attributes of the selected ancestor class are compatible with the received attributes; and
assigning the common ancestor class to the selected ancestor class.

8. The method of claim 1, wherein the configuration item record is associated with a history record.

9. The method of claim 8, wherein the history record includes a report ticket, a change request, an incident report, a classification change event, or a health report.

10. The method of claim 9, wherein the health report includes downtime records and network disconnection records.

11. The method of claim 1, wherein the attributes of the configuration item record include a unique identifier, a name, a description, and an owner identifier.

12. The method of claim 1, wherein the configuration item record is associated with a server, and wherein the attributes of the configuration item record include an IP address and operating system information.

13. The method of claim 12, wherein the operating system information includes an operating system distribution and a kernel version.

14. A system, comprising:
a processor; and
a memory coupled to the processor, wherein the memory is configured to provide the processor with instructions which when executed cause the processor to:
receive attributes of a configuration item record of a configuration management database (CMDB) identified as belonging to a previously identified child class;
determine based on the received attributes that the configuration item record should belong to a new child class and no longer belongs to the previously identified child class; and
change a classification of the configuration item record from the previously identified child class to the new child class including by, in response to determining to change the classification, automatically adding to the configuration item record one or more attributes of the new child class not previously belonging to the configuration item record and automatically removing from the configuration item record one or more attributes of the previously identified child class determined to be no longer valid to due to changing of the classification, while maintaining a same identifier in the configuration item record.

15. The system of claim 14, wherein the configuration item record is associated with a managed item, and wherein the new child class and the previously identified child class share a common ancestor class.

16. The system of claim 15, wherein the instructions which when executed cause the processor to determine based on the received attributes that the configuration item record belongs to the new child class and no longer belongs to the previously identified child class and cause the processor to:
determine that the managed item no longer belongs to the previously identified child class;
determine that the managed item belongs to the common ancestor class;
change the classification of the configuration item record to the common ancestor class;
determine that the managed item belongs to the new child class; and
change the classification of the configuration item record to the new child class.

17. A computer program product, the computer program product being embodied in a non-transitory computer readable storage medium and comprising computer instructions for:
receiving attributes of a configuration item record of a configuration management database (CMDB) identified as belonging to a previously identified child class;
determining based on the received attributes that the configuration item record should belong to a new child class and no longer belongs to the previously identified child class; and
changing a classification of the configuration item record from the previously identified child class to the new child class including by, in response to determining to change the classification, automatically adding to the configuration item record one or more attributes of the new child class not previously belonging to the configuration item record and automatically removing from the configuration item record one or more attributes of the previously identified child class determined to be no longer valid to due to changing of the classification, while maintaining a same identifier in the configuration item record.

18. The computer program product of claim 17, wherein the configuration item record is associated with a managed item, and wherein the new child class and the previously identified child class share a common ancestor class.

19. The computer program product of claim of 18, wherein the computer instructions for determining based on the received attributes that the configuration item record belongs to the new child class and no longer belongs to the previously identified child class include instructions for:
determining that the managed item no longer belongs to the previously identified child class;
determining that the managed item belongs to the common ancestor class;
changing the classification of the configuration item record to the common ancestor class;
determining that the managed item belongs to the new child class; and
changing the classification of the configuration item record to the new child class.

20. The computer program product of claim 19, wherein determining that the managed item belongs to the common ancestor class includes:

traversing a class inheritance hierarchy of the previously identified child class to identify one or more ancestor classes of the previously identified child class;

selecting one of the one or more ancestor classes, wherein attributes of the selected ancestor class are compatible with the received attributes; and assigning the common ancestor class to the selected ancestor class.

\* \* \* \* \*